A. R. Fenner,
Saw-Set,
N° 44,411.          Patented Sep. 27, 1864.
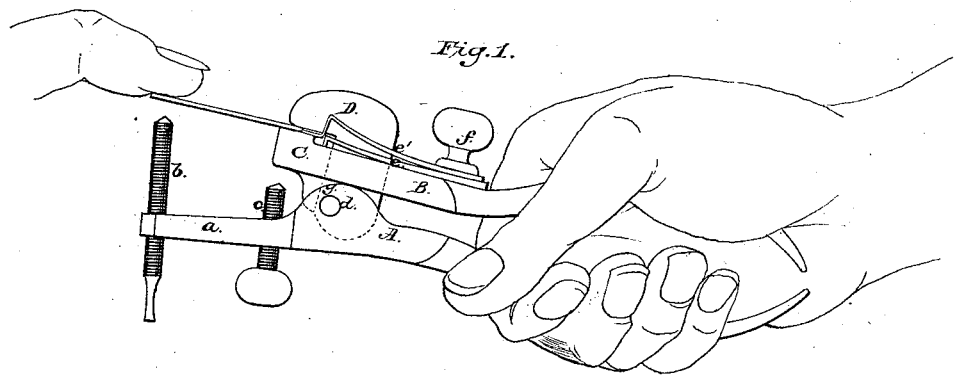
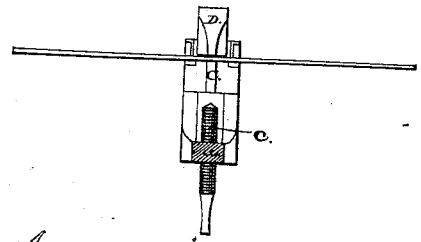
Witnesses.                                    Inventor:

UNITED STATES PATENT OFFICE.

A. R. FENNER, OF COLD BROOK, NEW YORK.

IMPROVED SAW-SET.

Specification forming part of Letters Patent No. 44,411, dated September 27, 1864.

*To all whom it may concern:*

Be it known that I, A. R. FENNER, of Cold Brook, in the county of Herkimer and State of New York, have invented a new and Improved Saw-Set; and I do hereby declare that the following is a full, clear, and exact description thereof, which will enable those skilled in the art to make and use the same, reference being had to the accompanying drawings, forming part of this specification, in which—

Figure 1 represents a side elevation of this invention. Fig. 2 is a tranverse vertical section of the same.

Similar letters of reference indicate corresponding parts.

The object of this invention is to arrange the set so that it will adapt itself to the variations in the thickness of a saw-blade; and this object is obtained by an eccentric arranged in combination with the two jaws of the set, and with the screw which regulates the amount of set to be given to each tooth in such a manner that at such places where the blade is thick its rear edge will be elevated less above the point of the regulating-screw than at those places where the blade is thin, and consequently the amount of set given to the teeth will be in proportion to the thickness of the blade at each point.

My saw-set is composed of two parts, A B, the rear ends of which form handles, by means of which the tool is operated. The part A is provided with a projecting lip, *a*, to receive the two screws *b c*, one of which regulates the amount of set to be given to each tooth, and the other the distance to which the two jaws C D of the set are allowed to open to take in the teeth of the saw.

The jaw D is connected to the handle A by a pivot, *d*, and its shank passes through a slot in the handle B behind the jaw C, which is rigidly attached to the handle B, and a spring, *e*, which is secured to the handle B by a setscrew, *f*, presses against the under surface of the jaw D and has a tendency to keep the two jaws open. By the action of this spring the point of the jaw C is depressed on the screw *c*, and the shank of said jaw is held down upon the eccentric projection *g*, which rises from the handle A, as clearly shown in Fig. 1 of the drawings. In compressing the two handles A B the shank of the jaw C, or that part between said jaw and the handle, turns on the projection *g*, and the jaw C rises higher and higher the closer it approaches the jaw D. If a saw-blade is placed between the two jaws, the rear edge of said blade rises up higher above the lip *a* if that portion held between the jaws is thick than it does if said part is thin, and by these means the amount of set given to the teeth is adapted to varying thickness of the teeth. The amount of set is regulated by the distance between the point of the screw *b* and the under surface of the saw-blade in the position which the same assumes when the jaws are closed up, and by depressing the rear edge of the blade until the under surface of the same comes in contact with the point of the regulating-screw the set of the tooth held between the jaws is produced.

If the blade at a certain tooth is thick, the jaws can not close up quite so near as on another tooth where the blade is thin, and consequently in the former case the rear edge of the saw will not rise up quite as high above the point of the regulating-screw as it will in the latter, and the set given to the thick tooth will be less than that given to the thin tooth in proportion to their respective thickness.

The spring *e* is adjustable backward and forward, and its front end is turned down so that the same can be used as the gage to determine the correct position of the teeth; or, when the saw-set is to be used for small saws, an additional gage, *e'*, may be fastened over the spring *e* by the set screw *f*, which secures said spring to the handle B. This gage is slotted and adjustable backward and forward, so that it can be set to suit teeth of different fineness.

This saw-set is very simple in its construction. It can be used for large and for small saws, and it will produce an even set independent of the variations in the thickness of the blade.

I claim as new and desire to secure by Letters Patent—

The eccentric *g*, arranged in combination with the jaws C D, handles A B, and regulating-screw *b*, substantially in the manner and for the purpose herein shown and described.

A. R. FENNER.

Witnesses:
HENRY FENNER,
TRUMAN L. ANDREWS.